(12) United States Patent
Jiang (10) Patent No.: US 11,671,172 B1
(45) Date of Patent: Jun. 6, 2023

(54) SYSTEMS AND METHODS FOR CHARACTERIZING AN OPTICAL FIBER IN A DENSE WAVELENGTH DIVISION MULTIPLEXING OPTICAL LINK

(71) Applicant: HUAWEI TECHNOLOGIES CO., LTD., Guangdong (CN)

(72) Inventor: Zhiping Jiang, Kanata (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 17/681,171

(22) Filed: Feb. 25, 2022

(51) Int. Cl.
| | | |
|---|---|---|
| H04B 10/07 | (2013.01) | |
| H04B 10/071 | (2013.01) | |
| H04B 10/2537 | (2013.01) | |
| H04J 14/02 | (2006.01) | |
| H04B 10/2507 | (2013.01) | |
| H04B 10/291 | (2013.01) | |
| G01M 11/00 | (2006.01) | |

(52) U.S. Cl.
CPC ......... *H04B 10/071* (2013.01); *G01M 11/319* (2013.01); *G01M 11/3109* (2013.01); *H04B 10/07* (2013.01); *H04B 10/2507* (2013.01); *H04B 10/2537* (2013.01); *H04B 10/2916* (2013.01); *H04J 14/02* (2013.01)

(58) Field of Classification Search
CPC .................. H04B 10/071; H04B 10/07; H04B 10/2507; H04B 10/2537; H04B 10/2916; G01M 11/3109; G01M 11/319; H04J 14/02
USPC .......................................... 398/9–38, 43–103
See application file for complete search history.

(56) References Cited

U.S. PATENT DOCUMENTS

| | | | | |
|---|---|---|---|---|
| 5,298,965 | A * | 3/1994 | Spirit ................... | G01M 11/319 356/73.1 |
| 5,724,126 | A * | 3/1998 | Nishi .................. | G01M 11/3181 356/73.1 |
| 6,072,614 | A * | 6/2000 | Roberts ................ | H04B 10/071 398/1 |
| 6,519,026 | B1* | 2/2003 | Holland ............. | G01M 11/3109 356/73.1 |
| 6,850,360 | B1* | 2/2005 | Chen ..................... | H01S 3/1312 359/341.33 |

(Continued)

OTHER PUBLICATIONS

Kjeldsen et al, SRS induced depletion of 1540nm signal copropagating with 1630nm OTDR pulses, Sep. 1996, Electronic Letters, All Document. (Year: 1996).*

(Continued)

*Primary Examiner* — Dibson J Sanchez
(74) *Attorney, Agent, or Firm* — BCF LLP (57) ABSTRACT

The disclosed systems and methods for characterizing an optical fiber in a dense wavelength division multiplexing (DWDM) optical link. The characterizing comprising: i) applying a power dither to data bearing optical signals propagating in the optical fiber, the power dither having a high-power level and a low-power level; ii) computing optical time-domain reflectometer (OTDR) traces corresponding to the high-power level and the low-power level of the power dither; iii) averaging the OTDR traces corresponding to the high-power level and the OTDR traces corresponding to the low-power level into average OTDR traces; computing a differential Stimulated Raman Scattering (SRS) gain from the OTDR traces; and iv) adjusting the average OTDR traces based on the differential SRS gain.

20 Claims, 10 Drawing Sheets

(56) References Cited

U.S. PATENT DOCUMENTS

| | | | |
|---|---|---|---|
| 6,922,532 B2* | 7/2005 | Simard | H04B 10/0775 398/177 |
| 9,240,836 B1* | 1/2016 | Chen | G01M 11/3136 |
| 9,419,708 B2 | 8/2016 | Rad et al. | |
| 9,435,712 B2* | 9/2016 | Chen | H04B 10/071 |
| 2002/0044314 A1* | 4/2002 | Michishita | H04B 10/071 398/3 |
| 2002/0140927 A1* | 10/2002 | Sobe | G01M 11/3154 356/73.1 |
| 2002/0159134 A1* | 10/2002 | Ghera | H04B 10/2916 359/334 |
| 2003/0048434 A1* | 3/2003 | Beller | H04B 10/071 356/73.1 |
| 2003/0231888 A1* | 12/2003 | Takashina | H04B 10/079 398/149 |
| 2005/0110980 A1* | 5/2005 | Maehara | H04B 10/071 356/73.1 |
| 2007/0041006 A1* | 2/2007 | Abbott | H04B 10/071 356/73.1 |
| 2009/0263069 A1* | 10/2009 | Hartog | H01S 3/094076 356/73.1 |
| 2014/0077971 A1* | 3/2014 | Archambault | G01M 11/3136 |
| 2015/0253217 A1* | 9/2015 | Gurusami | H01S 3/094076 356/73.1 |
| 2016/0277101 A1* | 9/2016 | Jiang | G01M 11/3118 |
| 2017/0205255 A1* | 7/2017 | Nannipieri | H04B 10/0731 |
| 2019/0101419 A1* | 4/2019 | Rowen | H01S 3/094011 |
| 2020/0049587 A1* | 2/2020 | Rapp | G01M 11/3109 |
| 2021/0404909 A1* | 12/2021 | Leclerc | G01M 11/3109 |
| 2023/0053180 A1* | 2/2023 | Al Sayeed | H04B 10/03 |

OTHER PUBLICATIONS

Tsai et al, Stimulated Raman Scattering Induced Baseband Video Distortion, Jul. 2002, IEEE, All Document. (Year: 2002).*

Reichmann et al, In-Service OTDR Limitations in CWDM Systems, Jul. 2004, IEEE, All Document. (Year: 2004).*

Kawakami et al, Online OTDR monitoring in novel remotely pumped EDF distributed Raman hybrid amplifier scheme, Feb. 2004, OFC, All Document. (Year: 2004).*

Kuo et al, Probe Trace Distortion of 1.65um Optical Time Domain Reflectometry in On Line Monitoring, Jan. 2004, JJAP, All Document. (Year: 2004).*

Kim et al, SRS induced power depletions of WDM signals by a high power OTDR signal in mobile fronthauls, Aug. 2014, COIN, All Document. (Year: 2014).*

Tsai, Study of SRS Effect in On-Line Monitoring Fiber Transmission Systems and Broadband Erbium-Doped Fiber Sources, 2003.

* cited by examiner

FIG. 17

SYSTEMS AND METHODS FOR CHARACTERIZING AN OPTICAL FIBER IN A DENSE WAVELENGTH DIVISION MULTIPLEXING OPTICAL LINK

CROSS-REFERENCE TO RELATED APPLICATIONS

This is the first application filed for the instantly disclosed technology.

TECHNICAL FIELD

The present disclosure generally relates to optical communications and, in particular, to systems and methods for characterizing an optical fiber in a dense wavelength division multiplexing (DWDM) optical link.

BACKGROUND

In wavelength division multiplexing (WDM)-based optical communication networks, multiple optical channels are carried on a single optical fiber. The single optical fiber is included in an optical fiber link. The optical fiber link connecting two nodes further includes optical amplifiers and other optical components along an optical transmission line. Optical amplifiers are used to amplify WDM optical signals which are transmitted in the optical fiber link.

There is a requirement to monitor quality of the optical fiber for efficient transmission of the WDM optical signals. Typically, an optical time-domain reflectometer (OTDR) is used to characterize the optical fiber. The OTDR may be used for estimating a fiber's length and overall attenuation, including indicating splice and connection losses, for example. The OTDR can also be used to locate faults, such as breaks, in the optical fiber. It is also known to provide small form factor fiber-optic transceiver modules having built-in test capability.

Typically, the OTDR injects a series of optical pulses into the optical fiber under test and detects light that is Rayleigh scattered and reflected from different locations in the fiber. The scattered or reflected light that is gathered is used to characterize the optical fiber. The strength of the return pulses is measured and integrated as a function of time and plotted as a function of length of the fiber.

The optical pulses injected by the OTDR have wavelengths which are outside the transmission bandwidth of the WDM optical signals. Due to a common nonlinear phenomenon in the WDM-based optical communication networks known as Stimulated Raman Scattering (SRS), at least some power from the optical pulses is transferred to WDM optical signals, leading to incorrect characterization of the optical fiber.

To this end, there is an interest in developing systems and methods for reducing the effect of SRS for efficiently characterizing the optical fibers.

SUMMARY

The embodiments of the present disclosure have been developed based on developers' appreciation of the limitations associated with the prior art. Typically, the optical pulses injected by an optical time-domain reflectometer (OTDR) have wavelengths which are outside the transmission bandwidth of the wavelength division multiplexing (WDM) optical signals. Due to a common nonlinear phenomenon in the WDM-based optical communication networks known as Stimulated Raman Scattering (SRS), at least some power from the optical pulses is transferred to WDM optical signals, leading to incorrect characterization of the optical fiber.

Developers of the present technology have devised methods and systems for efficiently characterizing an optical fiber in a dense wavelength division multiplexing (DWDM) optical link.

In accordance with a first broad aspect of the present disclosure, there is provided a method for characterizing an optical fiber in a dense wavelength division multiplexing (DWDM) optical link comprising: applying a power dither to data bearing optical signals propagating in the optical fiber, the power dither having a high-power level and a low-power level; computing optical time-domain reflectometer (OTDR) traces corresponding to the high-power level and the low-power level of the power dither; averaging the OTDR traces corresponding to the high-power level and the OTDR traces corresponding to the low-power level into average OTDR traces; computing a differential Stimulated Raman Scattering (SRS) gain from the OTDR traces; and adjusting the average OTDR traces based on the differential SRS gain.

In accordance with any embodiments of the present disclosure, adjusting the average OTDR traces comprises removing the differential SRS gain from the average OTDR traces.

In accordance with any embodiments of the present disclosure, the power dither is applied by modulating a pump current of an optical amplifier in the DWDM optical link.

In accordance with any embodiments of the present disclosure, the power dither has a frequency range between 0.1 and 1000 Hz.

In accordance with any embodiments of the present disclosure, further comprises monitoring the power dither.

In accordance with any embodiments of the present disclosure, the monitoring of the power dither further comprises adjusting the power dither such that a power dither amount γ has a value less than one and the power dither amount γ is given by: $\gamma=10^{\Delta P^{dB}/10}-1$ where $\Delta P^{dB}$ is the power difference (in dB) between the high-power level and the low-power level of the power dither.

In accordance with any embodiments of the present disclosure, adjusting the average OTDR traces comprises subtracting the differential SRS gain from the average OTDR traces.

In accordance with any embodiments of the present disclosure, further comprises removing the power dither from the data bearing optical signals.

In accordance with any embodiments of the present disclosure, the removing of the power dither comprises: detecting the power dither at an output of an optical amplifier in the DWDM optical link; and applying an opposite power dither to the optical amplifier, the opposite power dither having a phase shift of 180 degrees from the power dither, the opposite power dither canceling out the power dither.

In accordance with any embodiments of the present disclosure, the power dither is a square wave modulation.

In accordance with a second broad aspect of the present disclosure, there is provided a system for characterizing an optical fiber in a dense wavelength division multiplexing (DWDM) optical link comprising: a non-transitory memory element having instructions thereon; a processor coupled to the non-transitory memory element to execute the instructions to cause the processor to: apply a power dither to the data bearing optical signals propagating in the optical fiber, the power dither having a high-power level and a low-power level; compute optical time-domain reflectometer (OTDR) traces corresponding to the high-power level and the low-power level of the power dither; average the OTDR traces corresponding to the high-power level and the OTDR traces corresponding to the low-power level into average OTDR traces; compute a differential Stimulated Raman Scattering (SRS) gain from the OTDR traces; and adjust the average OTDR traces based on the differential SRS gain.

In accordance with any embodiments of the present disclosure, the processor is further configured to monitoring the power dither.

In accordance with any embodiments of the present disclosure, the processor is further configured to remove the power dither from the data bearing optical signals.

BRIEF DESCRIPTION OF THE FIGURES

Further features and advantages of the present disclosure will become apparent from the following detailed description, taken in combination with the appended drawings, in which.

It is to be understood that throughout the appended drawings and corresponding descriptions, like features are identified by like reference characters. Furthermore, it is also to be understood that the drawings and ensuing descriptions are intended for illustrative purposes only and that such disclosures do not provide a limitation on the scope of the claims.

DETAILED DESCRIPTION

The instant disclosure is directed to address at least some of the deficiencies of the current technology. In particular, the instant disclosure describes a system and a method for characterizing an optical fiber in a dense wavelength division multiplexing (DWDM) optical link.

As used herein, the term "about" or "approximately" refers to a +/−10% variation from the nominal value. It is to be understood that such a variation is always included in a given value provided herein, whether or not it is specifically referred to.

Unless otherwise defined or indicated by context, all technical and scientific terms used herein have the same meaning as commonly understood by one of ordinary skill in the art to which the described embodiments appertain to.

In the context of the present specification, unless provided expressly otherwise, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "first processor" and "third processor" is not intended to imply any particular order, type, chronology, hierarchy or ranking (for example) of/between the processor, nor is their use (by itself) intended to imply that any "second processor" must necessarily exist in any given situation. Further, as is discussed herein in other contexts, reference to a "first" element and a "second" element does not preclude the two elements from being the same actual real-world element. Thus, for example, in some instances, a "first" processor and a "second" processor may be the same software and/or hardware, in other cases they may be different software and/or hardware.

It will be understood that when an element is referred to as being "connected" or "coupled" to another element, it can be directly or indirectly connected or coupled to the other element or intervening elements that may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

In the context of the present specification, when an element is referred to as being "associated with" another element, in certain embodiments, the two elements can be directly or indirectly linked, related, connected, coupled, the second element employs the first element, or the like without limiting the scope of the present disclosure.

The terminology used herein is only intended to describe particular representative embodiments and is not intended to be limiting of the present technology. As used herein, the singular forms "a," "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof.

Implementations of the present technology each have at least one of the above-mentioned objects and/or aspects, but do not necessarily have all of them. It should be understood that some aspects of the present technology that have resulted from attempting to attain the above-mentioned object may not satisfy this object and/or may satisfy other objects not specifically recited herein.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

In the context of the present disclosure, the expression "data" includes data of any nature or kind whatsoever capable of being stored in a database. Thus, data includes, but is not limited to, audiovisual works (images, movies, sound records, presentations, etc.), data (location data, numerical data, etc.), text (opinions, comments, questions, messages, etc.), documents, spreadsheets, etc.

Software modules, modules, or units which are implied to be software, may be represented herein as any combination of flowchart elements or other elements indicating performance of process steps and/or textual description. Such modules may be executed by hardware that is expressly or implicitly shown.

With these fundamentals in place, the instant disclosure is directed to address at least some of the deficiencies of the current technology. In particular, the instant disclosure describes a system and a method for characterizing an optical fiber in the DWDM optical link.

Figure 1:
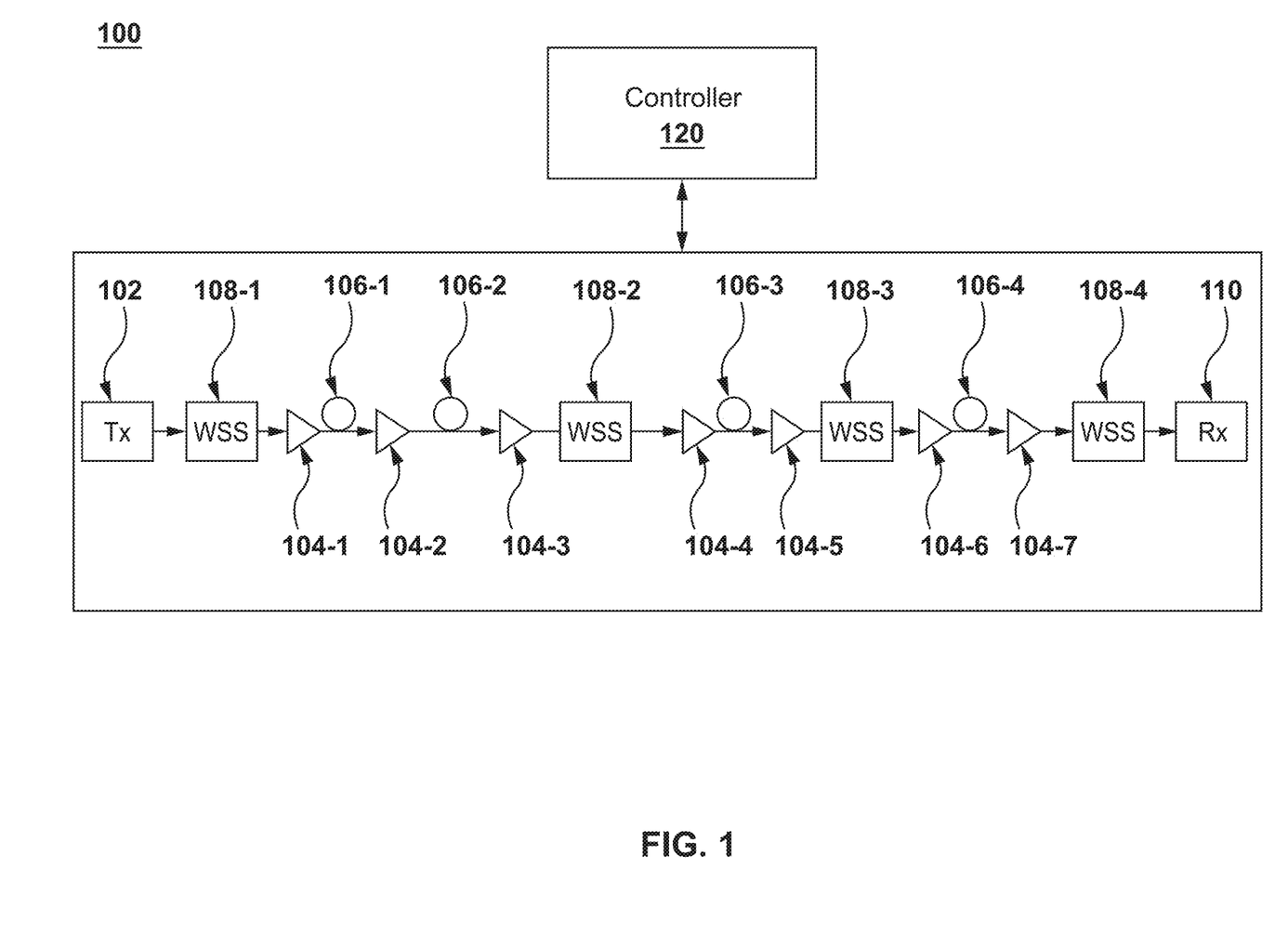
FIG. 1 illustrates a dense wavelength division multiplexing (DWDM) optical link, in accordance with various non-limiting embodiments of the present disclosure.

FIG. 1 illustrates a dense wavelength division multiplexing (DWDM) optical link 100, in accordance with various non-limiting embodiments of the present disclosure. As shown, the DWDM link 100 may include a transmitter 102, optical amplifiers 104-1, 104-2, . . . 104-7, optical fibers 106-1, 106-2, . . . 106-4, wavelength selective switches (WSSs) 108-1, 108-2, . . . 108-4, a receiver 110, and a controller 120. The DWDM optical link 100 may include other components. However, such components have not been illustrated for the purpose of simplicity.

The transmitter 102 may generate data bearing optical signals (interchangeably referred to as wavelength channels) to be transmitted over the optical fibers 106-1, 106-2, . . . 106-4. The optical amplifiers 104-1, 104-2, . . . 104-7 may be located along the optical fibers 106-1, 106-2, . . . 106-4. The optical amplifiers 104-1, 104-2, . . . 104-7 may be used to compensate the loss from the optical fibers 106-1, 106-2, . . . 106-4 and the associated components. It is to be noted that, for the purpose of simplicity only one transmitter 102 and one receiver 110 have been illustrated. However, it will be appreciated that in various non-limiting embodiments, there may be a set of transmitters (each with a unique wavelength) and a set of receivers. The data bearing optical signals from the set of transmitters may be multiplexed by an optical multiplexer on the transmitter side and the multiplexed data bearing optical signals may be demultiplexed by a demultiplexer on the receiver side.

As shown, the WSSs 108-1, 108-2, . . . 108-4 disposed between the transmitter 102 and the receiver 110 may be used to drop and/or add wavelength channels, and route wavelength channels. In certain non-limiting embodiments, the WSSs 108-1, 108-2, . . . 108-4 may act as optical filters.

Relatedly, in certain non-limiting embodiments, the WSSs 108-1, 108-2, . . . 108-4 may adjust/equalize the wavelength channel power.

In certain non-limiting embodiments, the DWDM optical link 100 may be implemented as a point-to-point optical link. In other non-limiting embodiments, the DWDM optical link 100 may be incorporated as a portion of a mesh optical network with advanced reconfigurable optical add-drop multiplexers (ROADMs) where the data bearing optical signals may re-routed to different fibers at ROADM site. The manner in which the DWDM optical link 100 is implemented is not intended to limit the scope of the present disclosure.

In certain non-limiting embodiments, the controller 120 may communicate with other components of the DWDM link 100 such as the transmitter 102, the optical amplifiers 104-1, 104-2, . . . 104-7, the WSSs 108-1, 108-2, . . . 108-4, the receiver 110 or the like. The controller 120 may control functionalities of various components of the DWDM link 100 and may have access to a link topology of the DWDM link 100. Also, the controller 120 may have access to the various link parameters e.g., WSS location, span loss, amplifier gain, amplifier noise figure, input power to amplifier or the like). It is to be noted that where the controller 120 is located in the DWDM link 100 and how the controller 120 communicate with the other components should not limit the scope of the present disclosure.

For efficient communications over the DWDM link 100, there may be a requirement to monitor the optical fiber quality. Generally, an optical time-domain reflectometer (OTDR) is used to characterize the optical fiber. Such an OTDR may be used for estimating an optical fiber's length and overall attenuation, including indicating splice and connection losses, for example. The OTDR may also be used to detect and locate faults, such as breaks, in the optical fiber. The OTDR may also be capable of providing small form factor fiber-optic transceiver modules having built-in test capability.

It is to be noted that the DWDM link 100 may include a plurality of optical spans. Each of the plurality of optical spans may include a couple of optical amplifiers (e.g., the optical amplifiers 104-1 and 104-2) and the optical fibers (e.g., the optical fiber 106-1, as shown in FIG. 1). It is to be noted that the two consecutive optical spans may have a common optical amplifier.

Figure 2:
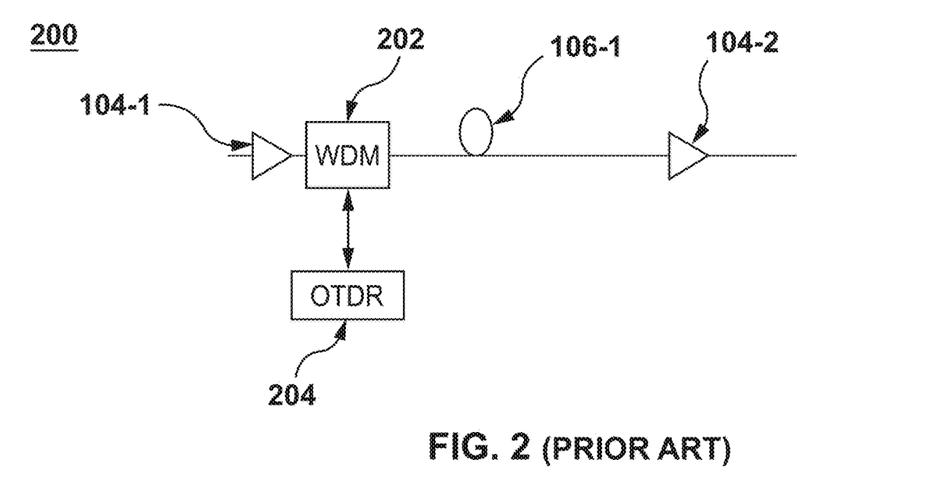
FIG. 2 (Prior Art) illustrates a high-level functional block diagram of a span including a wavelength division multiplexer and an OTDR.

FIG. 2 (Prior Art) illustrates a high-level functional block diagram of a span 200 including a wavelength division multiplexer (WDM) 202 and an OTDR 204. Typically, the OTDR 204 may generate a series of OTDR optical pulses. The OTDR 204 injects the series of OTDR optical pulses into the optical fiber under test (for example, the portion of optical fiber 106-1). The WDM 202 mixes the series of OTDR optical pulses with the multiplexed data bearing optical signals traveling in the optical fiber under test (for example, the optical fiber 106-1). At least a portion of the series of OTDR optical pulses may be reflected/Rayleigh scattered back from different locations in the optical fiber. The scattered or reflected portion of the series of OTDR optical pulses that is gathered by the OTDR 204 is used to characterize the optical fiber under test. The strength of the scattered or reflected portion of the series of OTDR optical pulses is measured and integrated as a function of time and plotted as a function of length of the optical fiber under test (for example, the optical fiber 106-1).

Figure 3:
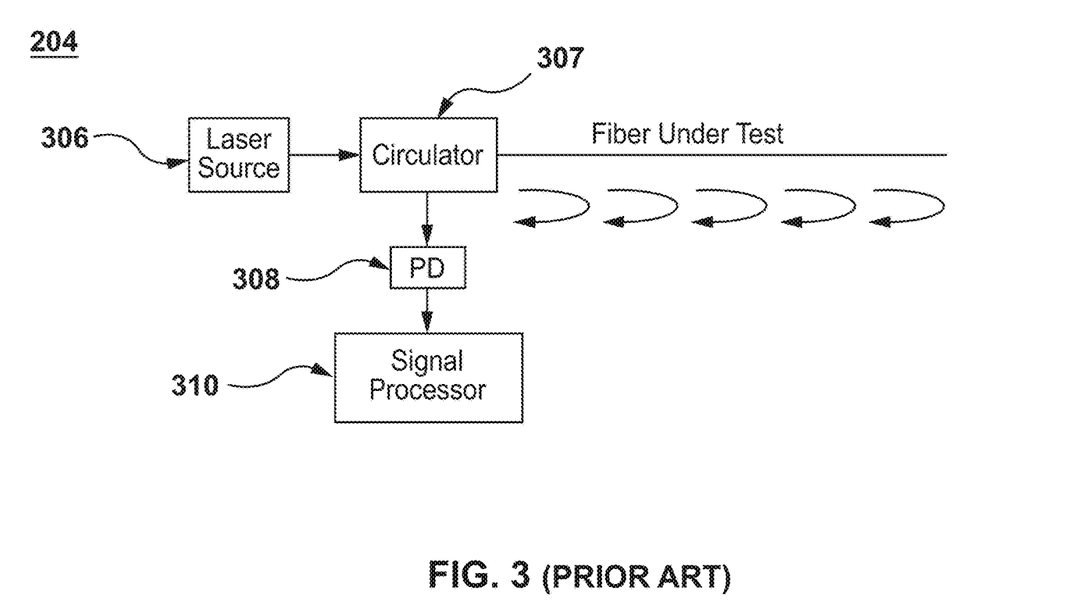
FIG. 3 (Prior Art) a schematic block diagram of the OTDR.
Figure 4:
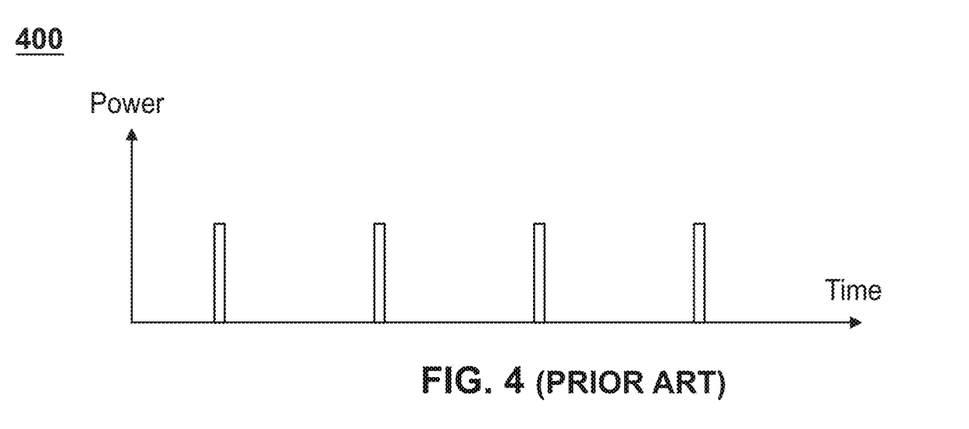
FIG. 4 (Prior Art) illustrates a representative of the series of OTDR optical pulses.

FIG. 3 (Prior Art) a schematic block diagram of the OTDR 204. As shown, the OTDR 204 includes a laser source 306, a circulator 307, a photodetector (PD) 308, and a signal processor 310. The laser source 306 generates the series of OTDR optical pulses. FIG. 4 (Prior Art) illustrates a representative 400 of the series of OTDR optical pulses.

Returning to FIG. 3, the OTDR 204 may forward the generated series of OTDR optical pulses towards the circulator 307. The circulator 307 may forward the forward the generated series of OTDR optical pulses towards the WDM 202 (as shown in FIG. 2). The WDM 202 mixes the series of OTDR optical pulses with the multiplexed data bearing optical signals traveling in the optical fiber under test (for example, the optical fiber 106-1). As previously noted, at least a portion of the series of OTDR optical pulses may be reflected/Rayleigh scattered back from different locations, the circulator 307 receives the reflected/Rayleigh scattered portion of the series of OTDR optical pulses. The circulator 307 forwards the reflected/Rayleigh scattered portion to the PD 308. The PD 308 may convert the reflected/Rayleigh scattered portion of the series of OTDR optical pulses to the corresponding the electrical signals. The PD 308 may forward the corresponding electrical signals to the signal processor 310. The signal processor 310 determines a strength of the scattered or reflected portion of the series of OTDR optical pulses integrated as a function of time to characterize the optical fiber.

Figure 5:
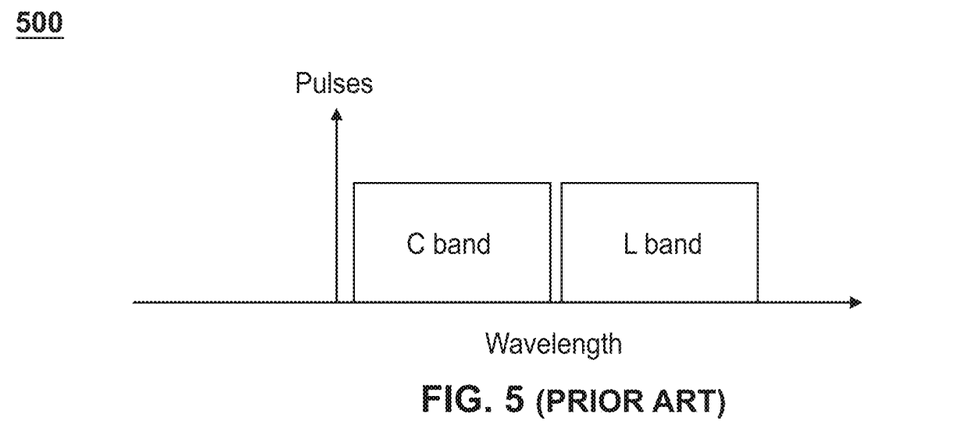
FIG. 5 (Prior Art) illustrates a representation of a wavelength of the series of OTDR optical pulses is shorter than the transmission bandwidth of the multiplexed optical signals.
Figure 6:
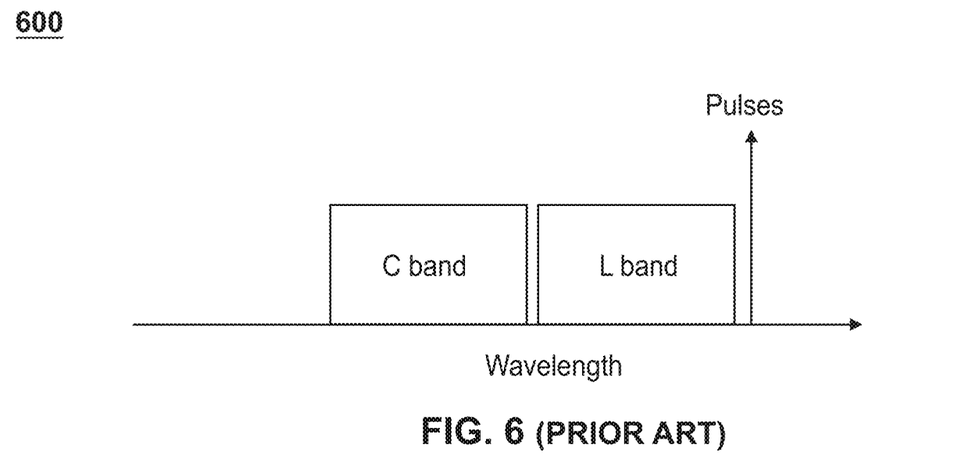
FIG. 6 (Prior Art) illustrates a representation of a wavelength of the series of OTDR optical pulses is longer than the transmission bandwidth of the multiplexed optical signals.

Generally, the wavelength of the series of OTDR optical pulses is outside the transmission bandwidth of the multiplexed data bearing optical signals. The wavelength of the series of OTDR optical pulses is either shorter or longer than the transmission bandwidth of the multiplexed data bearing optical signals. FIG. 5 (Prior Art) illustrates a representation 500 of a wavelength of the series of OTDR optical pulses is shorter than the transmission bandwidth of the multiplexed data bearing optical signals. FIG. 6 (Prior Art) illustrates a representation 600 of a wavelength of the series of OTDR optical pulses is longer than the transmission bandwidth of the multiplexed data bearing optical signals.

Figure 7:
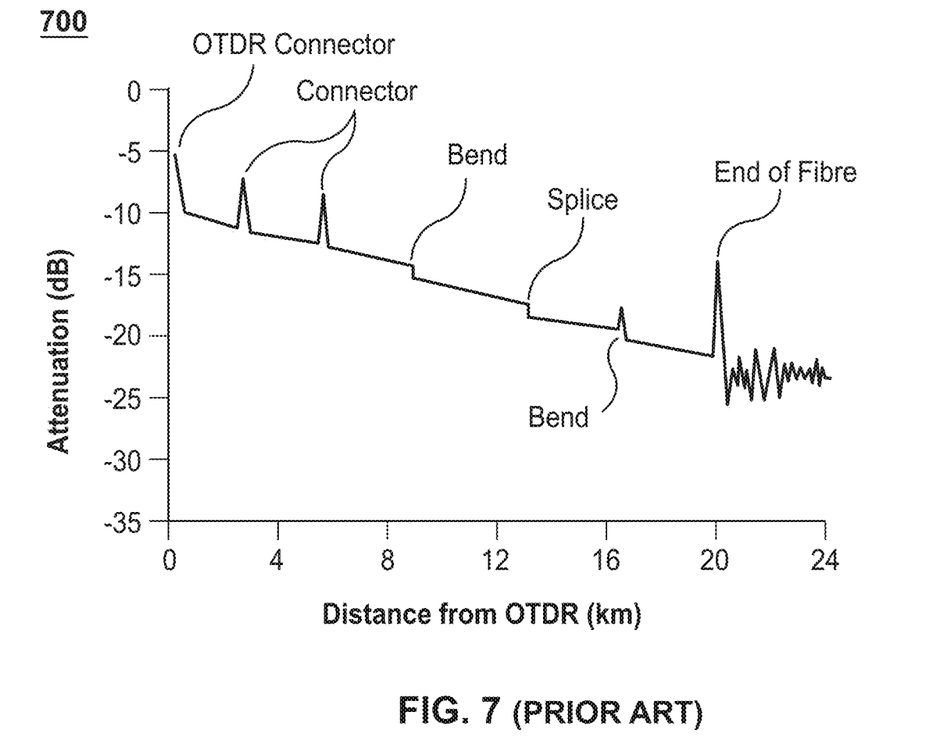
FIG. 7 (Prior Art) illustrates a representative characterization of the optical fiber under test.

FIG. 7 (Prior Art) illustrates a representative characterization 700 of the optical fiber under test. The characterization may be performed by the signal processor 310 (as shown in FIG. 3). The characterization illustrates attenuation in the optical fiber under test as a function of distance. As shown, a level of attenuation is higher at the locations where various connectors, bends, or splices are located in the optical fiber under test.

It is to be noted that although the series of OTDR optical pulses have been widely used to characterize the optical fiber under test, the characterization of the optical fiber may not be accurate particularly when the some real time data bearing optical signals are traversing through the optical fiber under test. A common nonlinear phenomenon in the WDM-based optical communication networks is Stimulated Raman Scattering (SRS). SRS is a nonlinear effect which occurs as a result of an incident wave scattering in a medium so that the incident wave is partially transferred to a higher wavelength.

Figure 8:
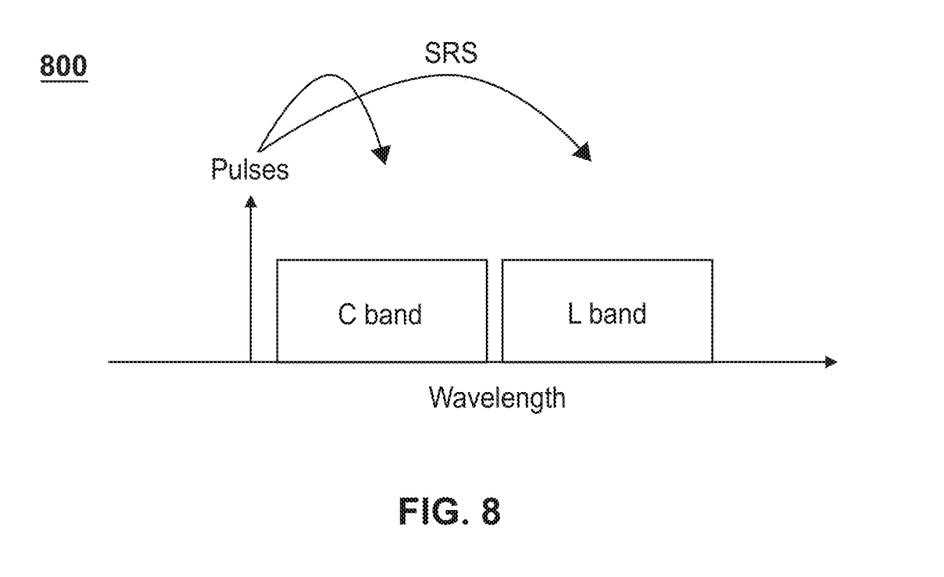
FIG. 8 illustrates a representation of Stimulated Raman Scattering (SRS) effect of the series of OTDR optical pulses over the multiplexed optical signals.

FIG. 8 illustrates a representation 800 of SRS effect of the series of OTDR optical pulses over the multiplexed data bearing optical signals. In the optical fiber supporting multiple wavelength-specific channels, energy from the channel with the shorter wavelength scatter to longer wavelength channels. Depending on the channel/fiber conditions in the optical fiber, such as channel numbers, channel locations, channel power, optical fiber type, fiber length, the result of this scattering phenomenon is inter-channel signal mixing and a progressive increase or decrease in perceived gain at higher wavelength channels, which contributes to a spectrum tilt in the transmitted WDM data bearing optical signal.

The spectrum tilt is further amplified as the WDM data bearing optical signal is transmitted through additional amplifiers and fiber in the network. To this end, SRS must be properly compensated to correctly characterize the optical fiber under test.

Figure 9:
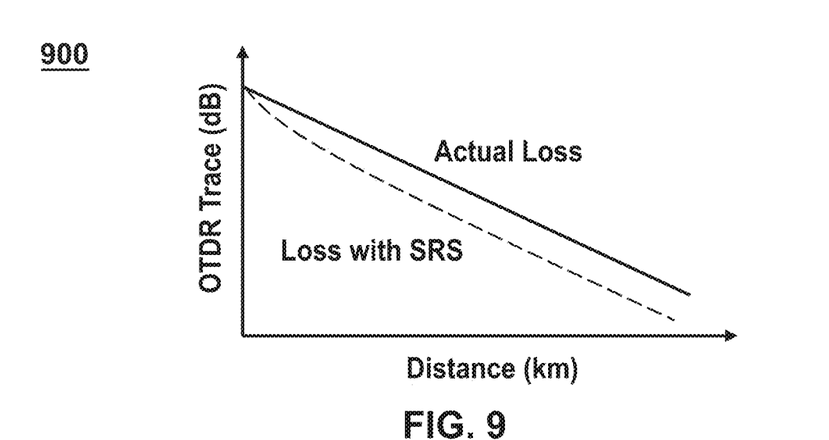
FIG. 9 illustrates a representation of an actual loss versus a loss with the SRS in the optical fiber under test.

In the event, when the wavelength of the series of OTDR optical pulses is shorter than the transmission band, some power from the series of OTDR optical pulses may be transferred to the multiplexed data bearing optical signals, leading to incorrect characterization of the optical fiber under test. FIG. 9 illustrates a representation 900 of an actual loss versus a loss with the SRS in the optical fiber under test.

Traditionally, only C band was used for transmission of WDM data bearing optical signals. However, to cater to the growing bandwidth requirement and increasing the total capacity, transmission in C+L band has been commercialized. SRS effect in C+L bands is much stronger than in the C only band. SRS mitigation also must consider the interaction between C and L bands.

Figure 10:
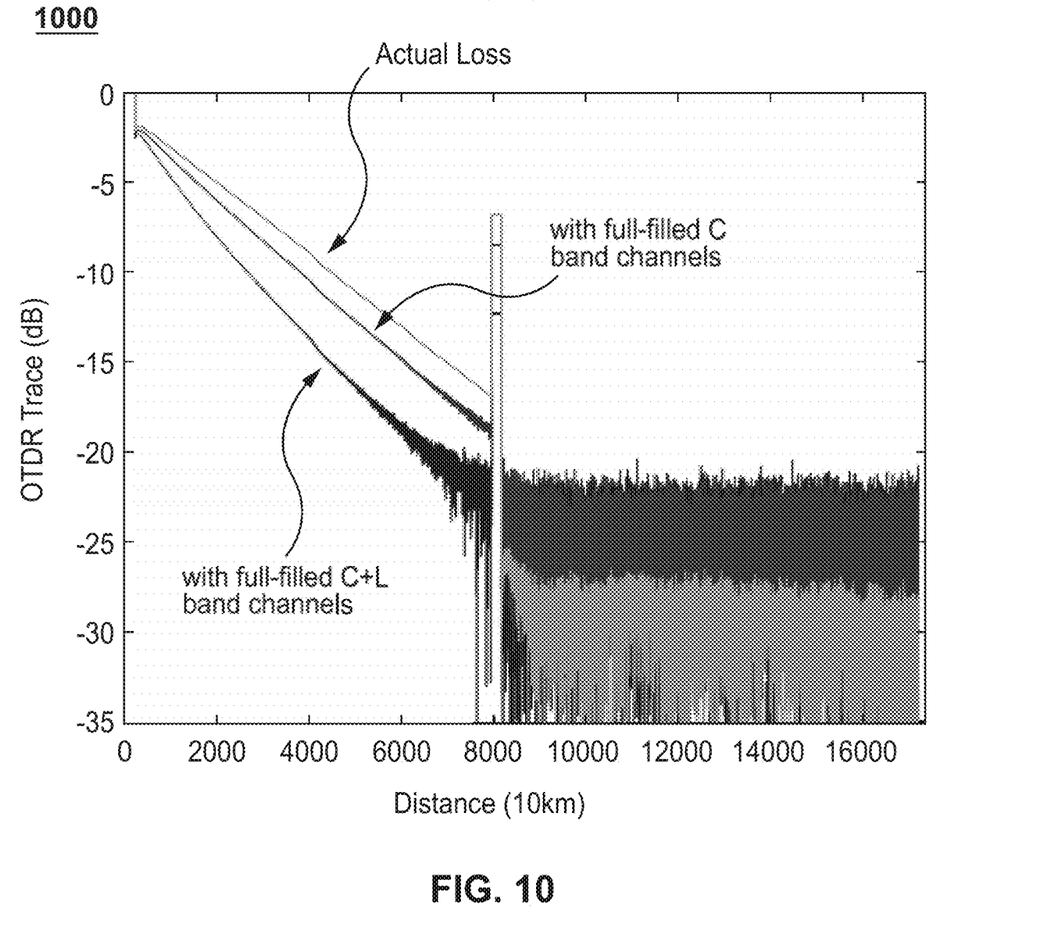
FIG. 10 illustrates a computed outcome representing the actual loss versus a loss with the SRS in C band versus a loss with the SRS in C+L in the optical fiber under test.

FIG. 10 illustrates a computed outcome 1000 representing the actual loss versus a loss with full-filled C band channels versus a loss with full-filled C+L band channels in the optical fiber under test. As shown, in the computed outcome 1000, the loss on the C+L band data bearing optical signals is much stronger than the loss in the C band data bearing optical signals.

With this said, there is an interest in developing systems and methods for reducing the effect of SRS in order to efficiently characterize optical fibers.

Figure 11:
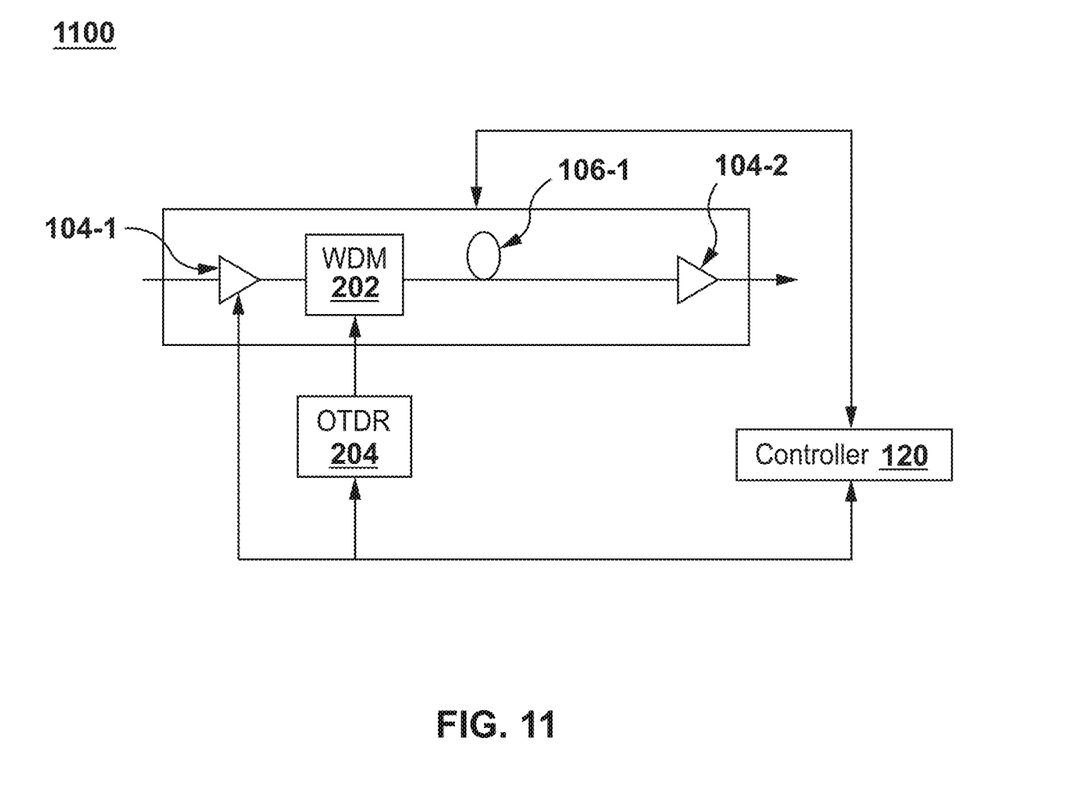
FIG. 11 illustrates a high-level functional block diagram of a modified optical span, in accordance with various non-limiting embodiments of the present disclosure.

FIG. 11 illustrates a high-level functional block diagram of a modified optical span 1100, in accordance with various non-limiting embodiments of the present disclosure. The modified optical span 1100 may include a communication with the controller 120. It is to be noted that the modified optical span 1100 may be incorporated in the DWDM optical link 100. Also, the DWDM optical link 100 may include a plurality of spans similar to the modified optical span 1100. In some non-limiting embodiments, each one of the plurality of spans similar to the modified optical span 1100 in the DWDM optical link 100 may communicate to the common controller 120. In other non-limiting embodiments, each one of the plurality of spans similar to the modified optical span 1100 in the DWDM optical link 100 may communicate with individual controllers similar to the controller 120. It is to be noted that where the controller 120 is located in the DWDM optical link 100 and the manner in which the modified optical span 1100 communicates with the controller 120 is not intended to limit the scope of the present disclosure.

A power dither may be introduced to the data bearing optical signals in the optical fiber (e.g., the optical fiber 106-1), and the associated SRS gain/loss change on the OTDR curve is accurately measured. With this accurate measurement, SRS induced distortion may be corrected.

Figure 12:
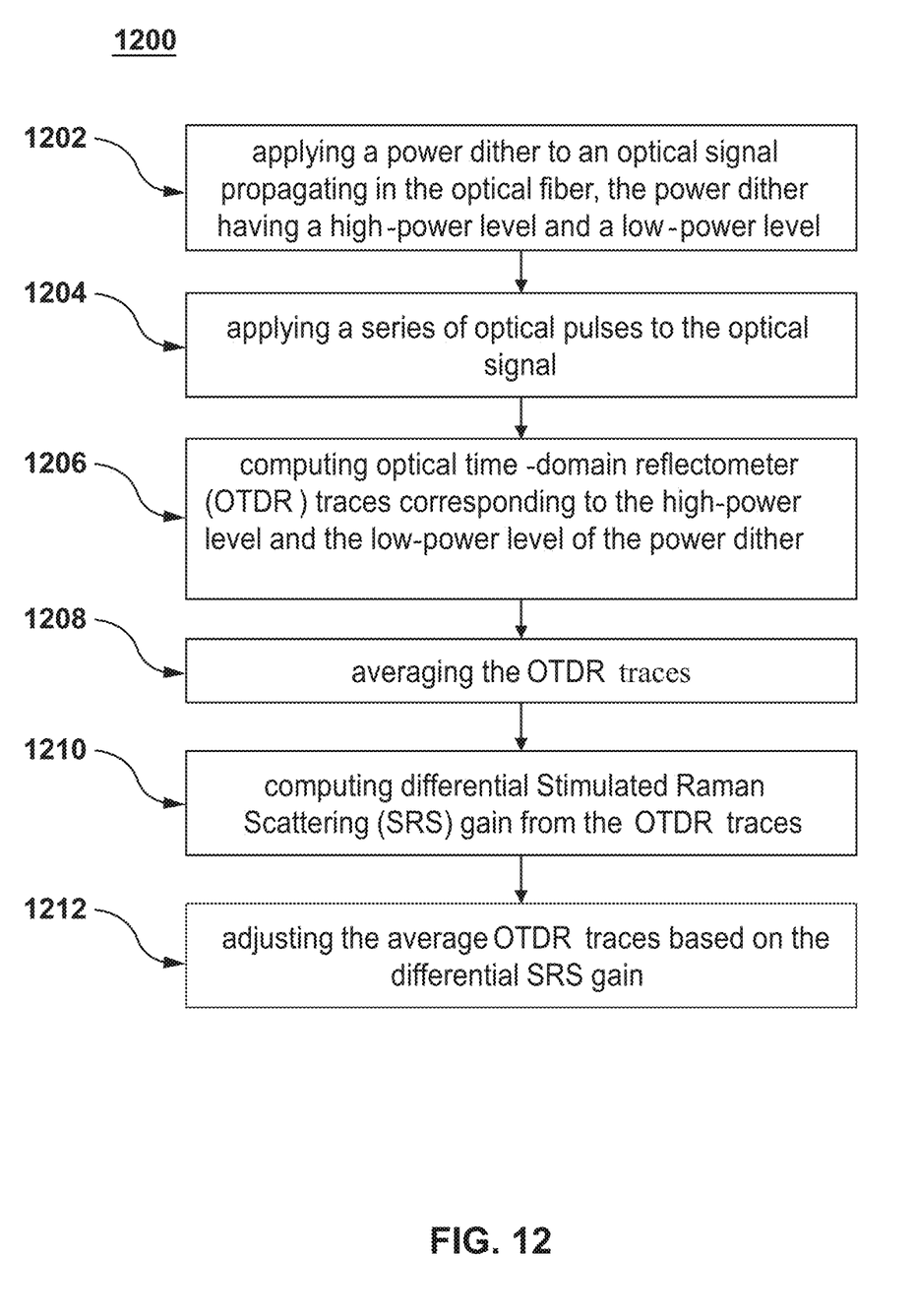
FIG. 12 illustrates a depicts a flowchart of a process representing a method for characterizing an optical fiber in the DWDM optical link, in accordance with various non-limiting embodiments of the present disclosure.

FIG. 12 illustrates a depicts a flowchart of a process 1200 representing a method for characterizing an optical fiber in the DWDM optical link 100, in accordance with various non-limiting embodiments of the present disclosure. As shown, the process 1200 commences at step 1202 where the controller 120 may apply a power dither to data bearing optical signals propagating in the optical fiber under test (e.g., the optical fiber 106-1), the power dither having a high-power level and a low-power level.

In some non-limiting embodiments, to apply the power dither to the data bearing optical signals propagating in the optical fiber under test (for example, the optical fiber 106-1), the controller 120 may provide a control signal to the first optical amplifier (e.g., the optical amplifier 104-1 as shown in FIG. 11) in the modified optical span 1100. In other non-limiting embodiments, in addition to or alternative to the optical amplifiers, the modified optical span 1100 may include variable optical attenuators (VOA) to apply the power dither to the data bearing optical signals. The controller 120 may provide a control signal to the VOAs in the modified optical span 1100.

Figure 13:
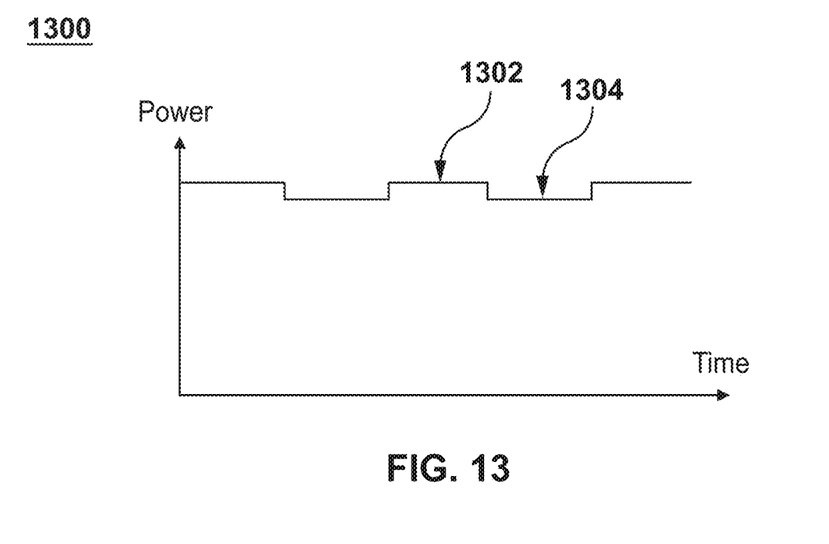
FIG. 13 illustrates a representative of the power dither applied to the data bearing optical signals, in accordance with various non-limiting embodiments of the present disclosure.

Based on the control signal, the first optical amplifier (e.g., the optical amplifier 104-1) may modulate a pump current to apply the power dither. In certain non-limiting embodiments, the application of the power dither may modulate an amplitude of the data bearing optical signals. FIG. 13 illustrates a representative of the power dither 1300 applied to the data bearing optical signals, in accordance with various non-limiting embodiments of the present disclosure. As shown, the power dither 1300 may have a high-power level 1302 and a low-power level 1304. The illustrated power dither 1300 may be a square wave modulation. In some other non-limiting embodiments, the power dither may be of any suitable shape, such as, for example, a sinusoidal wave modulation, a triangular wave modulation or the like. In certain non-limiting embodiments, the power dither may be a low frequency signal has a frequency range between 0.1 to 1000 Hz.

Returning to FIG. 12, the process 1200 proceeds to step 1204 where the OTDR 204 may apply a series of optical pulses to the data bearing optical signals. As previously noted in FIG. 3, the laser source 306 may generate a series of OTDR optical pulses. The OTDR 204 may forward the generated series of OTDR optical pulses towards the WDM 202 (as shown in FIG. 11). The WDM 202 may combine the series of OTDR optical pulses with the data bearing optical signals traveling in the optical fiber under test (e.g., the optical fiber 106-1).

The process 1200 advances to step 1206 where the controller 120 may compute (e.g., measure) optical time-domain reflectometer (OTDR) traces corresponding to the high-power level and the low-power level of the power dither. In certain non-limiting embodiments, the OTDR traces may be associated with the series of OTDR optical pulses.

As previously noted, a portion of the series of OTDR optical pulses may be reflected/Rayleigh scattered back from different locations in the optical fiber where the fiber's index of refraction changes. The scattered or reflected portion of the series of OTDR optical pulses that may be gathered by the OTDR 204 (as shown in FIG. 11). In certain non-limiting embodiments, the controller 120 may compute the OTDR traces by measuring the strength of the scattered or reflected portion of the series of OTDR optical pulses corresponding to the high-power level and the low-power level of the power dither. Further, the controller 120 may integrate the strength of the scattered or reflected portion of the series of OTDR optical pulses is measured as a function of time.

In order to efficiently and/or accurately measure the strength of the scattered or reflected portion of the series of OTDR optical pulses, the OTDR optical pulses may be synchronized with the power dither. In other words, a number of optical pulses transmitted during the high-power level of the power dither may be equal to the number of optical pulses transmitted during the low-power dither.

Figure 14:
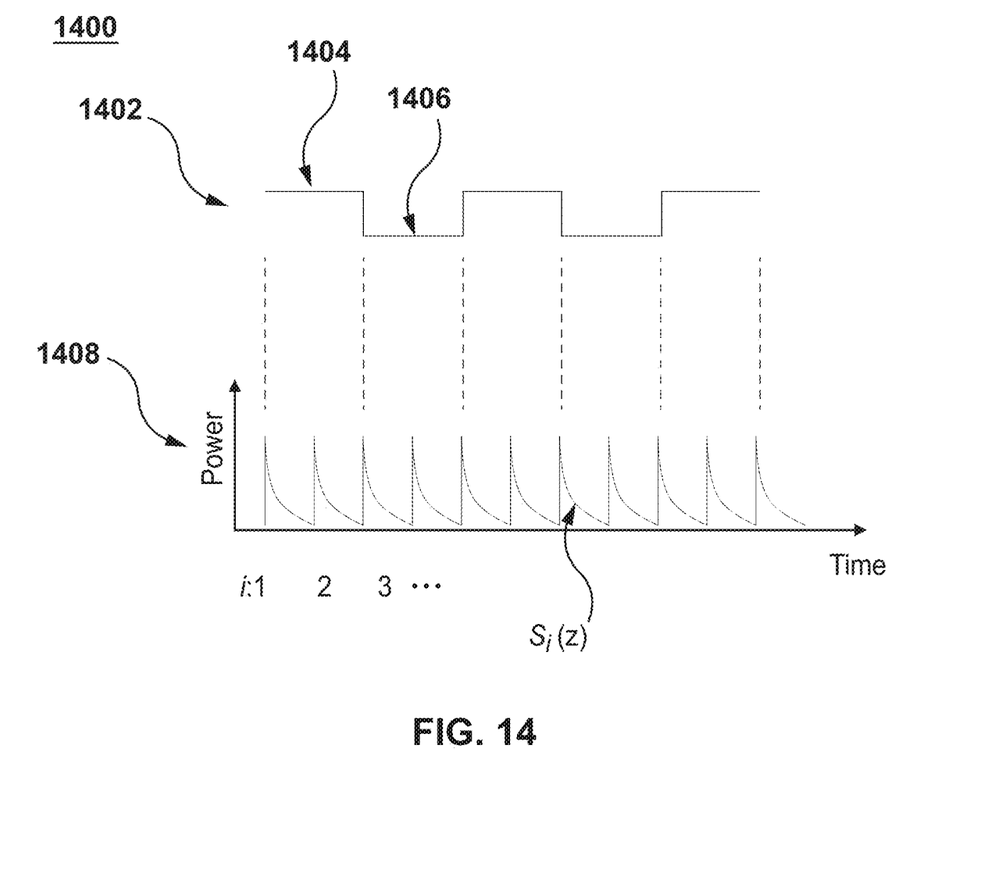
FIG. 14 illustrates a synchronization between the power dither and OTDR measurement, in accordance with various non-limiting embodiments.

FIG. 14 illustrates a synchronization between the power dither 1402 and OTDR measurement 1408, in accordance with various non-limiting embodiments. As shown, the power dither 1402 may have two power levels, a high-power level 1404 and a low power level 1406. By way of example, the number of optical pulses during the high-power level 1404 may be equal to two. Similarly, the number of optical pulses during the low-power level 1406 may be equal to two. The number of optical pulses during the high-power level 1404 and low-power level 1406 may be between one and many thousands.

It is to be noted that how the synchronization between the power dither 1402 and OTDR measurement 1408 is maintained should not limit the scope of the present disclosure. By way of example, the OTDR 204 may be synchronized in accordance with the power dither 1402 as generated by the optical amplifier (e.g., the optical amplifier 104-1). In another embodiment, the optical amplifier (e.g., the optical amplifier 104-1) may be synchronized in accordance with the series of optical pulse generated by the OTDR.

The controller 120 (as shown in FIG. 11) may compute the OTDR traces corresponding to the high-power level 1404. The OTDR traces corresponding to the high-power level 1404 may be represented as:

$$OTDR_H(z) = \frac{1}{N}\sum_{i=1}^{N} S_i(z) \quad (1)$$

Where $S_i(z)$ may represent the strength of the scattered or reflected portion of the ith optical pulse as a function of distance z and N may represent the total number of optical pulses during the high-power level 1404.

In a similar manner, the controller 120 (as shown in FIG. 11) may compute the OTDR traces corresponding to the low-power level 1406. The OTDR traces corresponding to the low-power level 1406 may be represented as:

$$OTDR_L(z) = \frac{1}{N}\sum_{k=N+1}^{2N} S_k(z) \quad (2)$$

Where $S_k(z)$ may represent the strength of the scattered or reflected portion of the kth optical pulse and N may represent the total number of optical pulses during the low-power level 1406. It is to be noted that the equation (1) and (2) may represent OTDR traces corresponding to one cycle of the power dither. In certain non-limiting embodiments, the OTDR traces may be computed for several cycles of the power dither. Further, the OTDR traces corresponding to the high-power levels may be averaged together to determine the $OTDR_H(z)$. In a similar manner, the OTDR traces corresponding to the low-power levels may be averaged together to determine the $OTDR_L(z)$.

Returning to FIG. 12, the process 1200 advances to step 1208 where, the controller 120 may average the OTDR traces $OTDR_H(z)$, and $OTDR_L(z)$. Without limiting the scope of the present disclosure, the average may be an arithmetic mean, median or mode. In one example, the average OTDR traces may be represented as:

$$OTDR(z) = 0.5[OTDR_H(z) + OTDR_L(z)] \quad (3)$$

It is to be noted that the average OTDR traces OTDR (z) may include SRS gain (in dB unit) due to the series of optical pulses in addition to the actual optical fiber loss. The average OTDR traces OTDR(z) (in dB unit) may also be represented as:

$$OTDR^{dB}(z) = OTDR_{Actual}^{dB}(z) + G_{SRS}^{dB}(z) \quad (4)$$

Where $OTDR_{Actual}^{dB}(z)$ may represent the actual optical fiber loss and $G_{SRS}^{dB}(z)$ may represent the SRS gain (in dB unit) due to the series of optical pulses.

The process 1200 proceeds to step 1210 where the controller 120 may compute differential SRS gain from the OTDR traces $OTDR_H(z)$, and $OTDR_L(z)$. In certain non-limiting embodiments, the differential SRS gain may be represented as:

$$\Delta G_{SRS}^{dB}(\gamma, z) = 10\log_{10}\left(\frac{OTDR_H(z)}{OTDR_L(z)}\right) \text{ (in dB)} \quad (5)$$

The differential SRS gain $\Delta G_{SRS}^{dB}(\gamma,z)$ may represent the differential SRS gain induced due to the power dither. In certain non-limiting embodiments, the SRS gain $G_{SRS}^{dB}(z)$ may be represented in terms of the differential SRS gain $\Delta G_{SRS}^{dB}(\gamma,z)$. By determining the SRS gain $G_{SRS}^{dB}(z)$ in terms of the differential SRS gain $\Delta G_{SRS}^{dB}(\gamma,z)$, the average OTDR traces OTDR(z) may be adjusted to determine the actual optical fiber loss.

Typically, the SRS gain $G_{SRS}^{dB}(z)$ is proportional to the linear pump power ($P_{pump}$) of the optical amplifier (e.g., the optical amplifier 104-1). Let $g_R$ be the Raman gain coefficient, $A_{eff}$, $L_{eff}$ effective area, length of the optical fiber 106-1. $P_{pump}$ may be the pump power (power of all data bearing optical signals other than the series of optical pulses traveling in the optical fiber 106-1). The pump power $P_{pump}$ induced SRS gain in dB may be given by:

$$\Delta G_{SRS}^{dB}(z) = 10\log_{10}\exp\left(g_R \frac{P_{pump}}{A_{eff}} L_{eff}(z)\right) = 4.3429\left(g_R \frac{P_{pump}}{A_{eff}} L_{eff}(z)\right) \quad (6)$$

Where the effective length $L_{eff}(z)$ may be given by:

$$L_{eff}(z) = \frac{1 - \exp(-\alpha_{pump} z)}{\alpha_{pump}} \quad (7)$$

Where $\alpha_{pump}$, maybe the fiber attenuation coefficient at the pump wavelength.

In certain non-limiting embodiments, the pump power may be dithered between two levels: $P_{pump}$ and $P_{pump}(1+\gamma)$, then the differential SRS gain $\Delta G_{SRS}^{dB}(z)$ is given by:

$$\Delta G_{SRS}^{dB}(z) = 4.3429\left(g_R \frac{\gamma P_{pump}}{A_{eff}} L_{eff}(z)\right) \quad (8)$$

Therefore, the SRS gain $G_{SRS}^{dB}(z)$ may be represented in the terms of the differential SRS gain $\Delta G_{SRS}^{dB}(z)$ as:

$$G_{SRS}^{dB}(z) = \frac{1}{\gamma}\Delta G_{SRS}^{dB}(z) \quad (9)$$

By measuring the differential SRS gain $\Delta G_{SRS}^{dB}(z)$ using equation (5), and selecting an appropriate power dither amount $\gamma$, the controller 120 may compute the SRS gain $G_{SRS}^{dB}(z)$.

In certain non-limiting embodiments, the power dither amount $\gamma$ may be related to the power difference $\Delta P^{dB}$ (in dB units) between the high-power level and the low-power level of the power dither. The power dither amount $\gamma$ may be represented as:

$$\gamma = 10^{\Delta P^{dB}/10} - 1 \qquad (10)$$

In certain non-limiting embodiments, the controller 120 may monitor the power dither. In some non-limiting embodiments, the controller 120 may monitor the power dither by monitoring an output power of the first optical amplifier (e.g., the optical amplifier 104-1) in the modified optical span 1100. In other non-limiting embodiments, the controller 120 may monitor the power dither by monitoring an input power of the second optical amplifier (e.g., the optical amplifier 104-2) in the modified optical span 1100. The power dither may be adjusted to maintain the value of the power dither amount γ less than one.

Finally, the process 1200 advances to step 1212 where the controller 120 may adjust (e.g., alter, change, modify or the like) the average OTDR traces $OTDR^{dB}(z)$ based on the differential SRS gain $\Delta G_{SRS}^{dB}(z)$. In certain non-limiting embodiments, the average OTDR traces $OTDR^{dB}(z)$ may be adjusted by removing the differential SRS gain from the average OTDR traces $OTDR^{dB}(z)$. In certain non-limiting embodiments, the average OTDR traces $OTDR^{dB}(z)$ may be adjusted by removing $1/\gamma \Delta G_{SRS}^{dB}(z)$ from the average OTDR traces $OTDR^{dB}(z)$.

Figure 15:
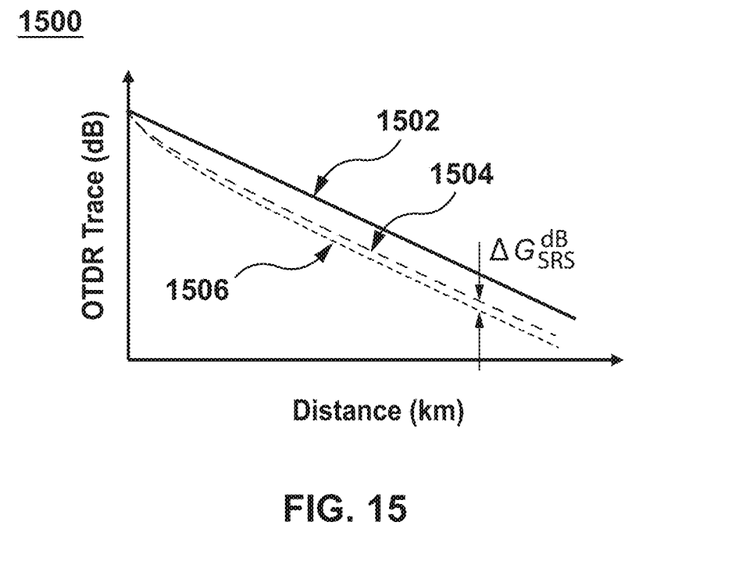
FIG. 15 illustrates a representation of actual OTDR traces $OTDR_{Actual}^{dB}(z)$ versus the OTDR traces $OTDR_H(z)$, and the OTDR traces $OTDR_L(z)$, in accordance with various non-limiting embodiments of the present disclosure.

FIG. 15 illustrates a representation 1500 of actual OTDR traces $OTDR_{Actual}^{dB}(z)$ 1502 versus the OTDR traces $OTDR_H(z)$ 1504, and the OTDR traces $OTDR_L(z)$, in accordance with various non-limiting embodiments of the present disclosure. The difference between the OTDR traces $OTDR_H(z)$ 1504, and the OTDR traces $OTDR_L(z)$ may represent the differential SRS gain $\Delta G_{SRS}^{dB}(z)$. In certain non-limiting embodiments, the controller 120 may modify the differential SRS gain $\Delta G_{SRS}^{dB}(z)$ in accordance with the power dither amount γ. The controller 120 may remove the modified differential SRS gain $1/\gamma \Delta G_{SRS}^{dB}(z)$ from the average OTDR traces $OTDR^{dB}(z)$ to efficiently compute the actual OTDR traces $OTDR_{Actual}^{dB}(z)$.

Figure 16:
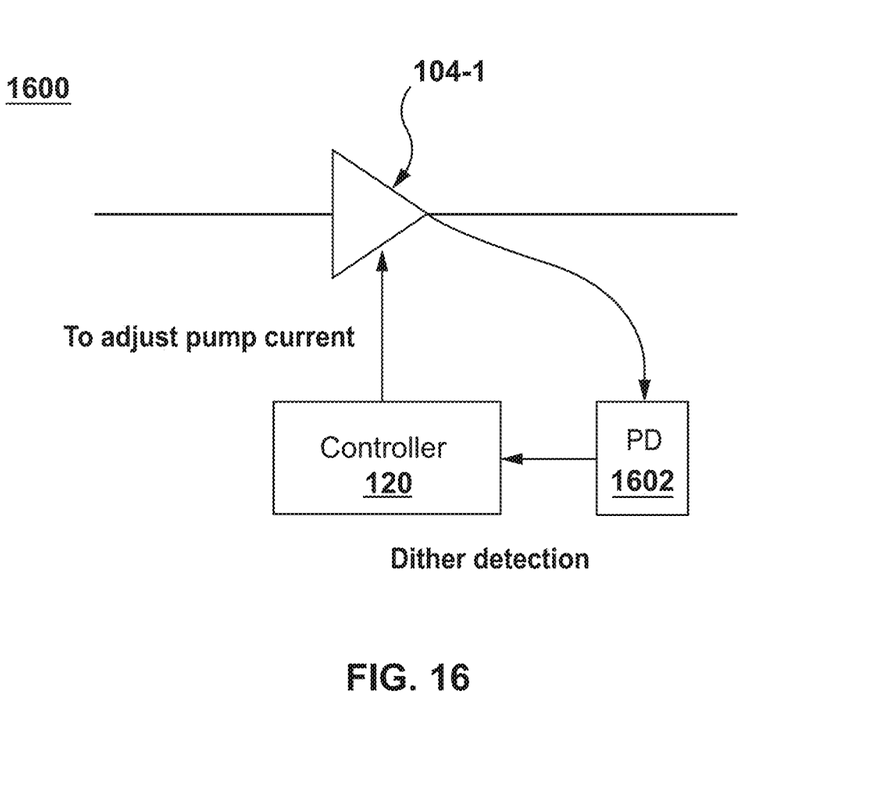
FIG. 16 illustrates a high-level functional block diagram of components for removing the power dither from the data bearing optical signals, in accordance with various non-limiting embodiments.

In certain non-limiting embodiments, the controller 120 may remove the power dither from the data bearing optical signals. The power dither may be removed so that the power dither may merely affect a particular optical span (e.g., modified optical span 1100, as shown in FIG. 11). FIG. 16 illustrates a high-level functional block diagram 1600 of components for removing the power dither from the data bearing optical signals, in accordance with various non-limiting embodiments. In certain non-limiting embodiments, the optical amplifier (e.g., the optical amplifiers 104-1) may have an associated photo detector (PD) (e.g., PD 1602). The PD 1602 may detect the power dither at an output of a second optical amplifier (e.g., the optical amplifier 104-2) in the optical span (e.g., the modified optical span 1100). The PD 1602 may forward the detected power dither to the controller 120.

The controller 120 may apply an opposite power dither to the second optical amplifier (e.g., the optical amplifier 104-2). The opposite power dither may have a phase shift of 180 degrees from the power dither. The opposite power dither is applied to cancel (or remove) the power dither.

Thus, by virtue of the modified optical span 1100, the OTDR traces may be efficiently determined by reducing the effect of SRS. Further, the optical fibers are efficiently characterized when real time data bearing optical signals are traveling through the optical fibers.

Figure 17:
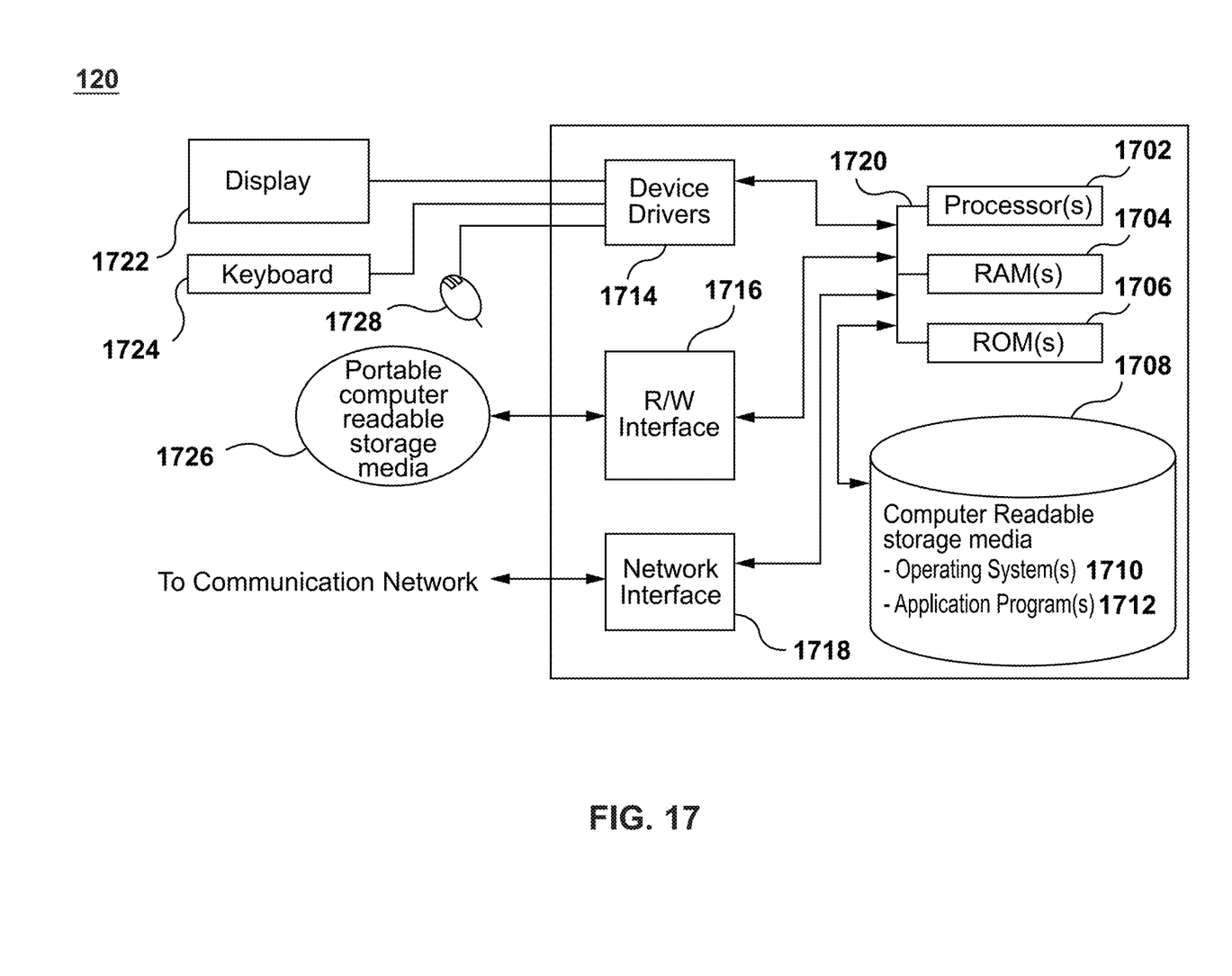
FIG. 17 depicts a high-level block diagram of components of the controller, in accordance with various embodiments of the present disclosure.

FIG. 17 depicts a high-level block diagram of components of the controller 120, in accordance with various embodiments of the present disclosure. It should be appreciated that FIG. 6 provides only an illustration of one implementation of the controller 120 and does not imply any limitations with regard to the environments in which different embodiments may be implemented. Various modifications to the depicted environment may be done to implement the controller 120 without departing from the principles presented herein. The controller 120 may be a server, a desktop computer, a laptop computer, or any device that may be configured to implement the present technology, as should be understood by a person skilled in the art.

As shown, the controller 120 employs one or more different type of processors 1702, one or more computer-readable random access memories (RAMs) 1704, one or more computer-readable read only memories (ROMs) 1706, one or more computer-readable storage media 1708, device drivers 1714, a read/write (R/W) driver interface 1716, a network interface 1718, all interconnected over a communication fabric 1720. The communication fabric 1720 may be implemented by any architecture designed for communicating data and/or control information between processors (such as microprocessors, communications and network processors, etc.), system memory, peripheral devices, and any other hardware components within a system.

The processor 1702 of the controller 120 may include one or more of a CPU, an accelerator, a microprocessor, a GPU, an NPU, an ASIC, a FPGA, a dedicated logic circuitry, a dedicated artificial intelligence processor unit, or combinations thereof. It is to be noted that where the processor 1702 is located in the DWDM optical link 100 should not limit the scope of the present disclosure.

One or more operating systems 1710 and one or more application programs 1712 (examples of application programs may include programming instructions) are stored on one or more of computer-readable storage media 1708 for execution by one or more of the processors 1702 via one or more of respective RAMs 1704 (which typically include a cache memory). In the illustrated embodiment, each of the computer-readable storage media 1708 maybe embodied as a magnetic disc storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

The R/W driver interface 1716 reads from and writes to one or more portable computer-readable storage media 1726. The application programs 1712 may be related to the intelligent heterogeneous computing system and stored on one or more of portable computer-readable storage media 1726, read via the respective R/W driver interface 1716 and loaded into the respective computer-readable storage media 1708.

Further, network interface 1718 may be based on a TCP/IP adapter card or wireless communication adapter (such as a wireless communication adapter using OFDMA technology). The application programs 1712 on the controller 120 may be downloaded to the controller 120 from an external computer or external storage device via a communication network (for example, the Internet, a local area network or other wide area network or wireless network) and network interface 1718. From network interface 1718, application programs 1712 may be loaded onto the computer-readable storage media 1708. The controller 120 may connect to routers, firewalls, switches, gateway computers and/or edge servers of the communication network using copper wires, optical fibers, wireless transmission, and the like.

The controller 120 may also include a display screen 1722, a keyboard or keypad 1724, and a computer mouse or touchpad 1728. The device drivers 1714 may interface with display screen 1722 for imaging, with the keyboard or the keypad 1724, with a computer mouse or touchpad 1728, and/or with display screen 1722 (which may be a touch sensitive display) for alphanumeric character entry and user selections. The device drivers 1714, R/W driver interface 1716 and network interface 1718 may comprise hardware and software (stored on the computer-readable storage media 1708 and/or the ROM 1706).

It is to be understood that the operations and functionality of the controller 120, constituent components, and associated processes may be achieved by any one or more of hardware-based, software-based, and firmware-based elements. Such operational alternatives do not, in any way, limit the scope of the present disclosure.

It will also be understood that, although the embodiments presented herein have been described with reference to specific features and structures, it is clear that various modifications and combinations may be made without departing from such disclosures. The specification and drawings are, accordingly, to be regarded simply as an illustration of the discussed implementations or embodiments and their principles as defined by the appended claims, and are contemplated to cover any and all modifications, variations, combinations or equivalents that fall within the scope of the present disclosure.

What is claimed is:

1. A method for characterizing an optical fiber in a dense wavelength division multiplexing (DWDM) optical link comprising:
   applying a power dither to data bearing optical signals propagating in the optical fiber, the power dither having a high-power level and a low-power level;
   computing optical time-domain reflectometer (OTDR) traces corresponding to the high-power level and the low-power level of the power dither;
   averaging the OTDR traces corresponding to the high-power level and the OTDR traces corresponding to the low-power level into average OTDR traces;
   computing a differential Stimulated Raman Scattering (SRS) gain from the OTDR traces; and
   adjusting the average OTDR traces based on the differential SRS gain.

2. The method of claim 1, wherein adjusting the average OTDR traces comprises removing the differential SRS gain from the average OTDR traces.

3. The method of claim 1, wherein the power dither is applied by modulating a pump current of an optical amplifier in the DWDM optical link.

4. The method of claim 1, wherein the power dither has a frequency range between 0.1 and 1000 Hz.

5. The method of claim 1 further comprises monitoring the power dither.

6. The method of claim 5 wherein the monitoring of the power dither further comprises adjusting the power dither such that a power dither amount γ has a value less than one and the power dither amount γ is given by:

$$\gamma = 10^{\Delta P^{dB}/10} - 1$$

where $\Delta P^{dB}$ is the power difference (in dB) between the high-power level and the low-power level of the power dither.

7. The method of claim 6, wherein adjusting the average OTDR traces comprises subtracting the differential SRS gain from the average OTDR traces.

8. The method of claim 1 further comprises removing the power dither from the data bearing optical signals.

9. The method of claim 8, wherein the removing of the power dither comprises:
   detecting the power dither at an output of an optical amplifier in the DWDM optical link; and
   applying an opposite power dither to the optical amplifier, the opposite power dither having a phase shift of 180 degrees from the power dither, the opposite power dither canceling out the power dither.

10. The method of claim 1, wherein the power dither is a square wave modulation.

11. A system for characterizing an optical fiber in a dense wavelength division multiplexing (DWDM) optical link comprising: a non-transitory memory element having instructions thereon; a processor coupled to the non-transitory memory element to execute the instructions to cause the processor to:
    apply a power dither to data bearing optical signals propagating in the optical fiber, the power dither having a high-power level and a low-power level;
    compute optical time-domain reflectometer (OTDR) traces corresponding to the high-power level and the low-power level of the power dither;
    average the OTDR traces corresponding to the high-power level and the OTDR traces corresponding to the low-power level into average OTDR traces;
    compute a differential Stimulated Raman Scattering (SRS) gain from the OTDR traces; and
    adjust the average OTDR traces based on the differential SRS gain.

12. The system of claim 11, wherein adjusting the average OTDR traces comprises removing the differential SRS gain from the average OTDR traces.

13. The system of claim 11, wherein the power dither is applied by modulating a pump current of an optical amplifier in the DWDM optical link.

14. The system of claim 11, wherein the power dither has a frequency range between 0.1 and 1000 Hz.

15. The system of claim 11 wherein the processor is further configured to monitoring the power dither.

16. The system of claim 15 wherein the monitoring of the power dither further comprises adjusting the power dither such that a power dither amount γ has a value less than one and the power dither amount γ is given by:

$$\gamma = 10^{\Delta P^{dB}/10} - 1$$

where $\Delta P^{dB}$ is the power difference (in dB) between the high-power level and the low-power level of the power dither.

17. The system of claim 16, wherein adjusting the average OTDR traces comprises subtracting the differential SRS gain from the average OTDR traces.

18. The system of claim 11 wherein the processor is further configured to remove the power dither from the data bearing optical signals.

19. The system of claim 18, wherein the removing of the power dither comprises:
    detecting the power dither at an output of an optical amplifier in the DWDM optical link; and
    applying an opposite power dither to the optical amplifier, the opposite power dither having a phase shift of 180 degrees from the power dither, the opposite power dither canceling out the power dither.

20. The system of claim 11, wherein the power dither is a square wave modulation.

* * * * *